Oct. 8, 1963    P. H. FOWLER    3,106,653
COIL SPOOL DRIVER VIBRATION TEST EQUIPMENT
Filed Dec. 24, 1958

INVENTOR
PETER H. FOWLER
BY *H. Vincent Harsha*
ATTORNEY

United States Patent Office 3,106,653
Patented Oct. 8, 1963

3,106,653
COIL SPOOL DRIVER VIBRATION
TEST EQUIPMENT
Peter H. Fowler, Arlington, Mass., assignor to Raytheon Company, a corporation of Delaware
Filed Dec. 24, 1958, Ser. No. 782,894
8 Claims. (Cl. 310—27)

This invention relates generally to equipment for testing electronic components and, more particularly, to equipment for testing the reliability of components under conditions of severe vibration.

In testing electronic components, such as electron tubes for use in missile and aircraft circuitry, for example, it is desirable to test the reliability of tube operation and tube life under conditions of vibration which produce predetermined accelerations over relatively wide ranges of vibrating frequencies. Vibration test equipment conventionally comprises a magnet with magnetic pole pieces separated by an air gap having a magnetic field into which a coil is inserted. The coil is wound on one portion of a piece of non-magnetic material, hereafter referred to as a coil former, suitably shaped so that the region on which the coil is wound fits into the air gap. An electronic component to be tested is mounted on another portion of said coil former.

When a suitable excitation voltage, such as a sine wave voltage or a voltage having the characteristics of random noise, is applied to the coil, a force is produced, which causes the coil former to move in a vibrating manner within the air gap. The motion of the coil former, accordingly, causes the electronic component mounted thereupon to vibrate. An acceleration, directly proportional to the force produced and inversely proportional to the combined mass of the coil former, the coil and the component mounted thereupon, is thereby produced. The frequency of vibration is dependent upon the frequency of the excitation voltage applied to the coil. An important requirement of vibration equipment is that substantially constant acceleration be maintained over a desired predetermined frequency range.

Present day equipment is generally capable of testing components over frequency ranges from approximately twenty cycles per second up to approximately two or three kilocycles per second. There has been a tendency in the industry to extend the range of test conditions to include vibrating frequencies up to ten kilocycles per second or higher. In most cases, however, present day equipment has two disadvantages which prevent the maintenance of a constant acceleration over frequency ranges extending to these higher frequency regions. First of all, undesirable resonances, which occur at points below ten kilocycles per second, produce acceleration peaks that destroy the flatness of the acceleration response curve. Secondly, because the input impedance of most vibrators is inductive, there is generally a decrease in acceleration response at the higher frequencies, so that the response curve of acceleration output as a function of frequency tends to drop off as the vicinity of ten kilocycles is approached.

Attempts are usually made to compensate for such disadvantages by the use of electrical feedback networks to suppress the undesirable resonances and by the use of higher input signal power at higher frequencies to bring up the curve at its high frequency end. Such feedback circuits usually require an accelerometer mounted so as to experience the same vibrations and accelerations as the tube under test. Few accelerometer feedback circuits are able to control the undesired resonance peaks and to maintain stability over such a wide frequency range.

This invention provides a vibration tester, the acceleration response of which is substantially flat over frequency ranges from twenty cycles to as high as fifteen kilocycles and requires no feedback networks or increase in power at the higher frequency regions. Such an improved response is brought about by the use of a coil former fabricated as a single piece of non-magnetic stainless steel. It has, heretofore, been believed that it is not desirable to utilize stainless steel for vibration coil formers because of its heavy mass. It was believed that the acceleration response of a solid stainless steel piece would deteriorate at high frequencies. For this reason, coil formers in equipment used prior to this invention are made completely of lighter material, such as aluminum or plastic, or are made so that the coil winding region only is fabricated of stainless steel and the rest of the assembly used to hold the component being vibrated is made of aluminum or plastic and cemented to the coil winding portion. Such a construction usually has a natural resonance of less than ten kilocycles per second.

The vibration tester of the invention, however, utilizes a coil former which is made from a single piece of stainless steel. Such a construction provides a coil former having a natural resonance above ten kilocycles per second and, in some cases, well above fifteen kilocycles per second. In addition, the invention also includes a copper sleeve placed around one of the magnetic pole pieces in the vicinity of the suspended coil at the air gap. The short circuited turn effect of this copper sleeve is such that the coil behaves almost as a pure resistance below its fundamental natural frequency. Thus, the combined use of a copper sleeve on one of the pole pieces and a coil former fabricated from a single piece of stainless steel provides an acceleration response curve that is substantially flat up to fifteen kilocycles or higher.

The invention can be more easily described with the help of the drawing in which.

Figure 1:
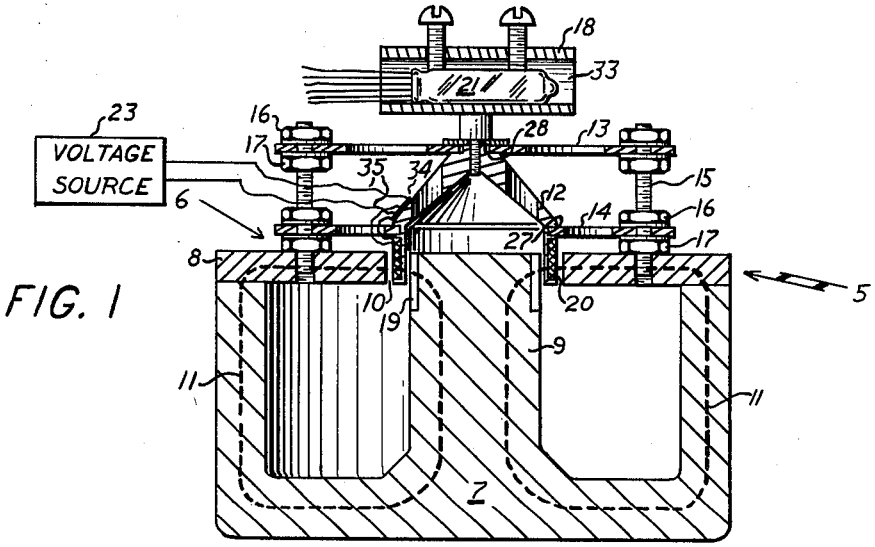
FIG. 1 shows a cross-section view of a vibrator which utilizes a particular embodiment of the invention.

In FIG. 1, there is shown a cross-section view of a vibrator 5 comprising a magnet 6. In the embodiment shown, magnet 6 is made up of a first piece 7 and a second piece 8. Magnet 6 may be constructed as a permanent magnet or may be constructed as an electromagnetic type with a coil wound around center leg 9. A magnetic path is thereby provided as shown by dashed lines 11. An air gap 10 exists in the magnetic path between the upper portion of center leg 9 and the inner face of second piece 8. A magnetic field thereby exists within air gap 10.

In air gap 10, there is suspended a coil 20 attached to a coil former 12. Coil former 12 is supported by a pair of plastic spiders 13 and 14 arranged to allow a vertical motion of the coil within the air gap. The spiders are so constructed that substantially zero lateral motion is allowed. This construction is shown more clearly in FIG. 2 wherein lower spider 14 is shown pictorially. A plurality of threaded rods 15 are provided to be inserted into second piece 8. The outer rims of spiders 13 and 14 are secured to rod 15 in a suitable manner as by nuts 16 and 17. Lower spider 14 is connected to coil former 12 at its inner ring 27 by means of a suitable resinous glue. A tube mount 18 is attached at the top of coil former 12 and is secured to inner ring 28 of upper spider 13. Tube mount 18 has a cylindrical opening 33 into which an electron tube 21 may be inserted for testing.

A copper sleeve 19 is placed around the upper portion of center leg 9 substantially adjacent to coil 20 at air gap 10 in such a manner that the outer surface of copper sleeve 19 coincides with the outer surface of center leg 9. Copper sleeve 19 has a thickness approximately equal to the thickness of the cross section of coil 20.

A pair of leads 22 attached to coil 20 are connected to a terminal strip 34 mounted on coil former 12. A second pair of leads 35 are connected at one end to leads 22 at terminal strip 34 and at the other end to a source of excitation 23. Source 23 may be a source of voltage having the characteristics of white noise or a source of voltage having sine wave characteristics, said sine wave voltage capable of being swept over a predetermined frequency range. As the source voltage excites coil 20, a force is generated to move coil former 12 and coil 20 so that the electron tube attached to the coil former is vibrated in a vertical direction.

Figure 2:
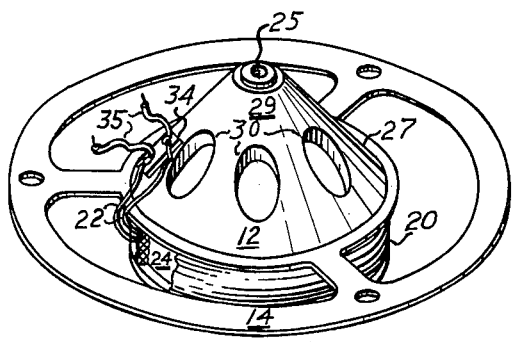
FIG. 2 shows a pictorial view of the particular embodiment of the coil former and a part of the coil former mounting device used in the invention.

FIG. 2 shows a pictorial view of coil former 12 having a recessed cylindrical region 24 around which excitation coil 20 is wound. The upper portion 29 of coil former 12 is conically shaped and has a threaded hole 25 at its top, into which tube holder 18 may be inserted. The sides of conically shaped portion 29 are tapered so that they are thicker at the top than at the bottom. A plurality of holes 30 are vertically drilled in the side of conical portion 29 in order to reduce the overall mass of the coil former. The coil former is fabricated from a single piece of stainless steel. Lower spider 14 is shown attached to coil former 12 at a region just above recessed coil region 24.

Figure 3:
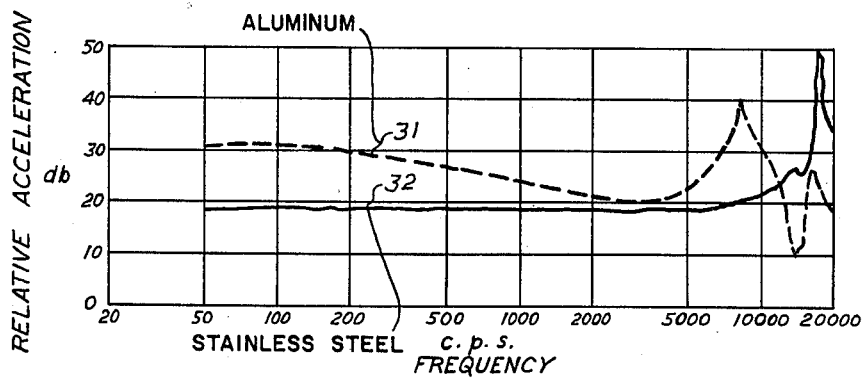
FIG. 3 is a graph showing comparative curves of the acceleration response vs. frequency input for a prior art vibrator utilizing an aluminum coil former and for the vibrator of the invention using a stainless steel coil former.

FIG. 3 shows a comparison of the response curves for an aluminum coil former and for the stainless steel coil former of the invention. Dotted curve 31 shows the relative acceleration response in db as a function of frequency in cycles per second for an aluminum type of coil former used in prior art types of vibrators. It can be seen that the aluminum coil former has resonances at 8 kilocycles and 16 kilocycles. In addition there is a gradual decrease in acceleration response curve 31 from 200 cycles per second to the higher frequency region. Solid curve 32 shows the acceleration response as a function of frequency for stainless steel coil former 12 of the invention. For the stainless steel coil former of the invention, the fundamental resonant frequency occurs at a value of approximately 17 kilocycles. Because of copper sleeve 19 placed around the center leg 9 of magnet 6, it has been found that the coil behaves substantially as a pure resistance below this fundamental resonant frequency and the curve remains substantially flat from its low frequency end at approximately 50 cycles to its high frequency end above 10 kilocycles.

It is believed that the principal reason that the coil former of the invention provides such good response characteristics is that the compressional resonant frequency of the stainless steel piece is higher than that of an aluminum or plastic piece. It had been generally believed by those in the art that the important resonance of the coil former was due to what is commonly known as the bell resonance of the coil former, which arises because of lateral deformations of the coil former in a direction perpendicular to its longitudinal direction. However, this invention is based upon the fact that the more important resonance is not the bell resonance but rather the compressional resonance, which arises because of deformations of the coil former along its longitudinal axis. Thus, the high stiffness of stainless steel maintains a high compressional resonant frequency as compared to that of aluminum or plastic.

Moreover, even when the coil former of the invention is loaded by the mass of the winding and by the mass of the component being tested, the anticipated drop in resonant frequency is a great deal less than it would be for the loading of an aluminum or plastic coil former. Specifically, one sample of coil former made of stainless steel showed a drop from its unloaded natural resonant frequency of 12 kilocycles to a loaded resonant frequency of 9.5 kilocycles, or a ratio of 1.26 to 1. Under the same conditions and for substantially the same configuration, the resonant frequency of an aluminum coil former changed from an unloaded natural resonant frequency of ten kilocycles to a loaded resonant frequency of 6.5 kilocycles, a ratio of 1.45 to 1. Moreover, because of the possibility of degradation of performance due to fatigue, a steel coil former maintains its performance characteristics for a longer period of time than that of aluminum or plastic. Stainless steel coil formers of the invention have been made to provide natural resonant frequencies up to as high as 17 kilocycles.

The flatness of the response curve at its higher frequency is enhanced by the presence of copper sleeve 19 around center leg 9 of magnet 6. This copper piece provides a short circuited turn effect such that the coil behaves substantially as a pure resistance below its fundamental resonant frequency. For a constant input voltage signal, there is no increase in input impedance at the high frequency end and, consequently, the input current remains substantially constant, and the output acceleration is maintained at a substantially constant value over the frequency range of interest.

This completes the description of the embodiment of the invention illustrated herein. However, many modifications and advantages thereof will be apparent to persons skilled in the art without departing from the spirit and scope of this invention. Accordingly it is desired that this invention not be limited to the particular details of the embodiment disclosed herein, except as defined by the appended claims.

What is claimed is:

1. A vibrator comprising a magnet having an air gap, said magnet supplying a magnetic field within said air gap; a non-magnetic stainless steel coil former; a coil wound around one portion of said coil former; means for supporting said coil former whereby said coil is suspended within said air gap; means for mounting an electronic component on another portion of said coil former, means for applying an excitation signal to said coil whereby said coil former and said electronic component mounting means are mechanically vibrated in accordance with said excitation signal.

2. A vibrator comprising a pair of magnetic pole pieces for supplying a magnetic field; means for supporting said pole pieces whereby said pole pieces are separated by an air gap; a copper sleeve attached to one of said pole pieces in the vicinity of said air gap; a non-magnetic stainless steel coil former; a coil wound around one portion of said coil former; means for supporting said coil former whereby said coil is suspended within said air gap; means for mounting an electronic component on another portion of said coil former, means for applying an excitation signal to said coil whereby said coil former and said electronic component mounting means are mechanically vibrated in accordance with said excitation signal.

3. A vibrator comprising a pair of magnetic pole pieces for supplying a magnetic field; means for supporting said pole pieces whereby said pole pieces are separated by an air gap; a copper sleeve attached to one of said pole pieces in the vicinity of said air gap; a non-magnetic stainless steel coil former; a first portion of said coil former being cylindrically shaped and a second portion of said coil former being conically shaped; a coil wound around said cylindrical portion of said coil former; means for mounting an electronic component on said conical portion of said coil former; means for supporting said coil former whereby said coil is suspended within said air gap; means for applying an excitation signal to said coil whereby said coil former and said electronic component mounting means are mechanically vibrated in accordance with said excitation signal.

4. A vibrator comprising a pair of magnetic pole pieces for supplying a magnetic field; means for supporting said pole pieces whereby said pole pieces are separated by an air gap; a copper sleeve attached to one of said pole pieces in the vicinity of said air gap; a non-magnetic stainless steel coil former; a first portion of said coil former being cylindrically shaped and a second portion of said coil former being conically shaped, said conically shaped portion having tapered sides; a coil wound around said cylindrical portion of said coil former; means for mounting an electronic component on said conical portion of said coil former; means for supporting said coil former whereby said coil is suspended within said air gap; means for applying an excitation signal to said coil whereby said coil former and said electronic component mounting means are mechanically vibrated in accordance with said excitation signal.

5. A vibrator comprising a pair of magnetic pole pieces for supplying a magnetic field; means for supporting said pole pieces whereby said pole pieces are separated by an air gap; a copper sleeve attached to one of said pole pieces in the vicinity of said air gap; a non-magnetic stainless steel coil former; a first portion of said coil former being cylindrically shaped and a second portion of said coil former being conically shaped, said conically shaped portion having tapered sides, said tapered sides having a plurality of holes symmetrically disposed around said conically shaped portion, a coil wound around said cylindrical portion of said coil former; means for mounting an electronic component on said conical portion of said coil former; means for supporting said coil former whereby said coil is suspended within said air gap; means for applying an excitation signal to said coil whereby said coil former and said electronic component mounting means are mechanically vibrated in accordance with said excitation signal.

6. A vibrator comprising a pair of magnetic pole pieces for supplying a magnetic field; means for supporting said pole pieces whereby said pole pieces are separated by an air gap; a copper sleeve attached to one of said pole pieces in the vicinity of said air gap; a non-magnetic stainless steel coil former; a first portion of said coil former being cylindrically shaped and a second portion of said coil former being conically shaped, said conically shaped portion having tapered sides; a coil wound around said cylindrical portion of said coil former; means for mounting an electronic component on said conical portion of said coil former; means comprising a plurality of plastic spiders placed in spaced parallel relationship for supporting said coil former whereby said coil is suspended within said air gap; means for applying an excitation signal to said coil whereby said coil former and said electronic component mounting means are mechanically vibrated in accordance with said excitation signal.

7. A vibrator comprising a magnet having an air gap, said magnet supplying a magnetic field within said air gap; a coil former comprising a material that has a modulus of elasticity greater than $19 \times 10^{11}$ dynes/cm.$^2$ and a specific gravity greater than 7.75; a coil wound around one portion of said coil former; means for supporting said coil former whereby said coil is suspended within said air gap; means for mounting an electronic component on another portion of said coil former; means for applying an excitation signal to said coil whereby said coil former and said electronic component mounting means are mechanically vibrated in accordance with said excitation signal.

8. A vibrator comprising a pair of magnetic pole pieces for supplying a magnetic field; means for supporting said pole pieces whereby said pole pieces are separated by an air gap; a copper sleeve attached to one of said pole pieces in the vicinity of said air gap; a coil former comprising a material that has a modulus of elasticity greater than $19 \times 10^{11}$ dynes/cm.$^2$ and a specific gravity greater than 7.75; a first portion of said coil former being cylindrically shaped and a second portion of said coil former being conically shaped, said conically shaped portion having tapered sides; a coil wound around said cylindrical portion of said coil former; means for mounting an electronic component on said conical portion of said coil former; means comprising a plurality of plastic spiders placed in spaced parallel relationship for supporting said coil former whereby said coil is suspended within said air gap; means for applying an excitation signal to said coil whereby said coil former and said electronic component mounting means are mechanically vibrated in accordance with said excitation signal.

References Cited in the file of this patent

UNITED STATES PATENTS

| | | |
|---|---|---|
| 1,767,837 | Davis | June 24, 1930 |
| 2,289,962 | Hancock | July 14, 1942 |
| 2,556,816 | Lukacs | June 12, 1951 |
| 2,810,842 | Lewis | Oct. 22, 1957 |

FOREIGN PATENTS

| | | |
|---|---|---|
| 789,725 | Great Britain | Jan. 29, 1958 |

OTHER REFERENCES

Cohen: "Hi-Fi Loudspeakers and Enclosures," 1956, pages 60–61, TK 6565 L6C6 C.3, published by Rider Pub., 480 Canal St., New York.